(12) United States Patent
Cress et al.

(10) Patent No.: US 8,875,758 B2
(45) Date of Patent: Nov. 4, 2014

(54) FEATURES FOR MAINTAINING VOIDS WITHIN A TIRE TREAD

(75) Inventors: Ronald Cress, Simpsonville, SC (US); Gildas De-Staercke, Simpsonville, SC (US); James F. Garrett, Simpsonville, SC (US); Nathan J. Panning, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 680 days.

(21) Appl. No.: 13/127,795

(22) PCT Filed: Nov. 5, 2008

(86) PCT No.: PCT/US2008/082496
§ 371 (c)(1),
(2), (4) Date: May 5, 2011

(87) PCT Pub. No.: WO2010/053478
PCT Pub. Date: May 14, 2010

(65) Prior Publication Data
US 2011/0214789 A1 Sep. 8, 2011

(51) Int. Cl.
*B60C 11/117* (2006.01)
*B60C 11/02* (2006.01)
*B60C 11/00* (2006.01)
*B60C 11/03* (2006.01)

(52) U.S. Cl.
CPC ............. *B60C 11/00* (2013.01); *B60C 11/0323* (2013.01); *B29C 2030/061* (2013.01); *B60C 11/02* (2013.01); *B29D 30/606* (2013.01)
USPC .................................. 152/209.17; 152/209.6

(58) Field of Classification Search
CPC ........... B29D 2030/61; B29D 30/0306; B60C 11/0323; B60C 11/24; B60C 11/246; B60C 11/02
USPC ............. 152/209.6, 209.17, 154.2, 187, 188, 152/208, 210; 156/95, 96, 110.1, 113, 909, 156/928; 264/36.14, 501, 326, 328.3, 264/DIG. 74; 425/17, 46
See application file for complete search history.

(56) References Cited

U.S. PATENT DOCUMENTS 1,431,785 A 10/1922 Emery
1,518,529 A 12/1924 Linderme
(Continued)

FOREIGN PATENT DOCUMENTS

CN 1556743 A 12/2004
GB 997690 A 7/1965
(Continued)

OTHER PUBLICATIONS

PCT/US2008/082496 International Search Report and Written Opinion dated Jan. 6, 2009, 9 pages.
Computerized English translation of JP 2007-331597 A, 18 pages.
CN1556743A—English abstract and machine translation obtained from Espacenet (http://worldwide.espacenet.com) on Feb. 5, 2013, 9 pages.

*Primary Examiner* — Eric Hug
(74) *Attorney, Agent, or Firm* — Hahn Loeser & Parks LLP; Bret A. Hrivnak (57) ABSTRACT

Particular embodiments of the present invention include tire treads that include a tread body having a length, a width, and thickness, the thickness being bounded by an outer surface and an underside surface. Such treads may also include a void positioned within the thickness of the tread body. Such treads may further include one or more members extending between the void and the tread underside surface. Other embodiments of the present invention include a tire having such treads, as well as molds for forming such treads.

21 Claims, 9 Drawing Sheets

(56) References Cited

U.S. PATENT DOCUMENTS

| | | | |
|---|---|---|---|
| 1,876,016 A | | 4/1932 | Pederson |
| 2,148,343 A | | 2/1939 | Flautt |
| 2,708,470 A | * | 5/1955 | Gramelspacher ............. 152/208 |
| 2,960,138 A | * | 11/1960 | Chiodo ..................... 152/209.5 |
| 2,966,936 A | | 1/1961 | Schelkmann |
| 3,107,713 A | * | 10/1963 | Cushman .................... 152/187 |
| 4,703,787 A | | 11/1987 | Ghilardi |
| 4,934,426 A | | 6/1990 | Remond et al. |
| 5,275,218 A | | 1/1994 | Nakayama et al. |
| 6,408,910 B1 | | 6/2002 | Lagnier et al. |
| 7,186,103 B2 | | 3/2007 | Menard |
| 2004/0197432 A1 | | 10/2004 | Menard |
| 2008/0023116 A1 | * | 1/2008 | Mayni et al. ................ 152/154.2 |
| 2008/0152745 A1 | | 6/2008 | Nguyen et al. |
| 2009/0199944 A1 | | 8/2009 | Goto et al. |

FOREIGN PATENT DOCUMENTS

| | | | |
|---|---|---|---|
| JP | 2007-331597 A | | 12/2007 |
| WO | WO 2008/054387 | * | 5/2008 |
| WO | WO 2008/066527 | * | 6/2008 |

* cited by examiner

FEATURES FOR MAINTAINING VOIDS WITHIN A TIRE TREAD

This application is a National Stage application of International Application No. PCT/US2008/082496, filed Nov. 5, 2008, to which this application claims priority and the benefit of, the disclosure of which is also hereby incorporated by reference.

BACKGROUND OF THE INVENTION

1. Field of the Invention

The invention relates generally to tire treads having voids within a thickness of the tire tread, and, more specifically, to treads having features for restricting the flow of material into such voids during tire molding and/or curing operations, and/or reducing crack initiation and/or propagation along any such void during tire operation.

2. Description of the Related Art

It is commonly known for tire treads to contain various molded tread elements and features to enhance tire performance. It is also commonly known that these molded tread elements and features may be formed concurrently with a tire during tire molding and curing operations, or independently by way of a tread mold prior to applying the tread to a tire or tire carcass, such as when performing tire retreading operations.

Tread features include, without limitation, grooves and sipes, each of which form voids within a thickness of the tread. In certain instances, the tread voids are maintained below an outer tread surface, or, in other words, submerged (i.e., hidden or embedded) below the outer tread surface in such a way as to be substantially hidden from view in the new state of the tread. In such instances, submerged features may be provided to supply additional tread void and/or traction edges for enhanced tire performance at worn stages of the tire tread. When a tread is pre-formed, such as for retreading a tire, the submerged tread voids may be formed along or through the underside surface of the tread, the underside surface being the surface that will later be bonded to the tire casing. Accordingly, the void is open to the tread underside surface. After the tread is formed, it is applied to a tire or tire carcass.

After a pre-molded tread is applied to a tire, the tire is finally molded or cured in a subsequent process, where the tire is heated and pressurized. During any such process, uncured material, such as bonding material, may be forced into the void through the underside surface. In effect, this material at least partially fills the void, which may reduce the effectiveness of the submerged feature. For example, when the feature is a groove, the groove provides a void to consume or absorb water for improved wet performance. When the groove, however, is at least partially filled with the displaced material, the void volume and the effectiveness of the groove is less than optimal. In another example, the tread feature may comprise a sipe, which generally comprises a slit or narrow groove. The sipe provides an additional traction edge for improved tire traction, but also has the effect of reducing local tread stiffness due to the discontinuity that it forms. When the sipe, however, becomes at least partially filled with displaced material, the sipe may operate less than optimally as a traction edge, and/or to reduce the local stiffness of the tread. Accordingly, there is a need to substantially limit and/or prevent the influx, flow, or entry of material into a tread feature void from the underside of the tread during a curing operation.

A further problem may arise during tire operation, subsequent to tire formation. More specifically, when a void extends to the underside of a tread, a crack may initiate in proximity to the void, such as where the void intersects the tread underside surface.

SUMMARY OF THE INVENTION

Particular embodiments of the present invention include tire treads having members for substantially minimizing or preventing the flow of material from an underside of the tread and into a void contained within a thickness of the tread, and/or for reducing or eliminating crack initiation and/or propagation adjacent the void. Particular embodiments of the tire tread include a tread body having a length, a width, and thickness, the thickness being bounded by an outer surface and an underside surface. Such treads may also include a void positioned within the thickness of the tread body. Such treads may further include one or more members extending from a side of the void, and between at least a portion of the void and the tread underside surface. In particular embodiments, such treads may form a portion of a tire.

Particular embodiments of the present invention may also include a mold for forming a molded tire tread, the mold including a cavity formed by a plurality of mold portions and having a cavity bottom surface. The mold may also include a void-forming element extending within the cavity, the element forming a void within a thickness of the tread. Such molds may also include a recess-forming element extending between the cavity bottom surface and the void-forming element. Further, the mold may also include one or more recesses positioned adjacent to the void-forming element, the one or more recesses forming one or more members within the molded tread, the one or more members collectively extending at least partially across a width of the tread void at least when the tread is applied to a tire. In particular embodiments, one or more recesses positioned adjacent to the void-forming element, the one or more recesses forming one or more members within the molded tread, the one or more members extending from a side of the void, and between at least a portion of the void and a tread underside surface.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF PARTICULAR EMBODIMENTS

Particular embodiments of the present invention provide tire treads having tread voids located within a thickness of the tread, and members or protrusions extending from a side of the void, and positioned between at least a portion of the void and the underside surface of the tread, and tire tread molds for forming the same, for the purpose of sufficiently reducing and/or substantially preventing undesired material from flowing into the void during tire curing operations, and/or to reduce the initiation and/or propagation of cracks in the proximity of the voids, and along the underside of the tread during tire operation. Any such tread having one or more members as contemplated herein may form a portion of a tire.

In particular instances, a pre-molded tread is used to form a final tire product. For example, in tire retreading operations, a tire tread is first molded and subsequently applied to a tire or tire carcass to form a retreaded tire. A pre-molded tread generally includes a top or outer surface, which is generally associated with the outer surface of a tire, and an underside surface used for engagingly attaching the tread to the tire or tire carcass. After molding the tread, which may be fully or partially cured, the tread is applied to the tire or tire carcass. A layer of adhesive material may or may not be interposed between the tread and the tire or tire carcass to promote adhesion and attachment of the tread to the tire or tire carcass. The layer of adhesive material may comprise, for example, a layer of cushion gum rubber or other adhesive.

Tire treads may include a variety of tread features. For example, treads may include features such as ribs, blocks, grooves, and/or sipes, each of which may extend in any direction of the tire, such as, laterally or circumferentially. Particular features, such as grooves and sipes, for example, form voids in the tread. In certain instances, it may be desirous to position a tread feature or void below the tread outer surface, and within a thickness of the tread, to provide a submerged (i.e., hidden or embedded) feature or void. For example, the void may form a submerged groove or sipe. A tread feature or void may also be in communication with the tread outer surface (i.e., not submerged or not completely submerged). For any tread feature, when the tread is pre-molded, a void existing within the tread may be formed by penetrating the tread underside. Accordingly, when the pre-molded tread is applied to a tire carcass, material underlying or adjacent to the tread underside may enter the void during any subsequent tire molding and/or curing operation if the aperture or opening extending through the underside surface is not sufficiently reduced or substantially covered or closed. If the undesired material enters the void, the tread feature may not operate as designed or intended. As discussed above, if the feature is a groove, the intended void is sized to accept an amount of water to improve wet tire performance, which may operate less than optimally when receiving any undesired material. Also as discussed above, if the feature is a sipe, the sipe may operate less than optimally if undesired material at least partially fills the sipe. Accordingly, it is desirous to substantially prevent material from entering the tread void from the underside of the tread during tire curing operations. Further, subsequent to tire formation, and during tire operation, cracks may initiate and/or propagate in close proximity to the feature or void along the underside of the tread, such as where the void intersects the tread underside surface.

Figure 1:
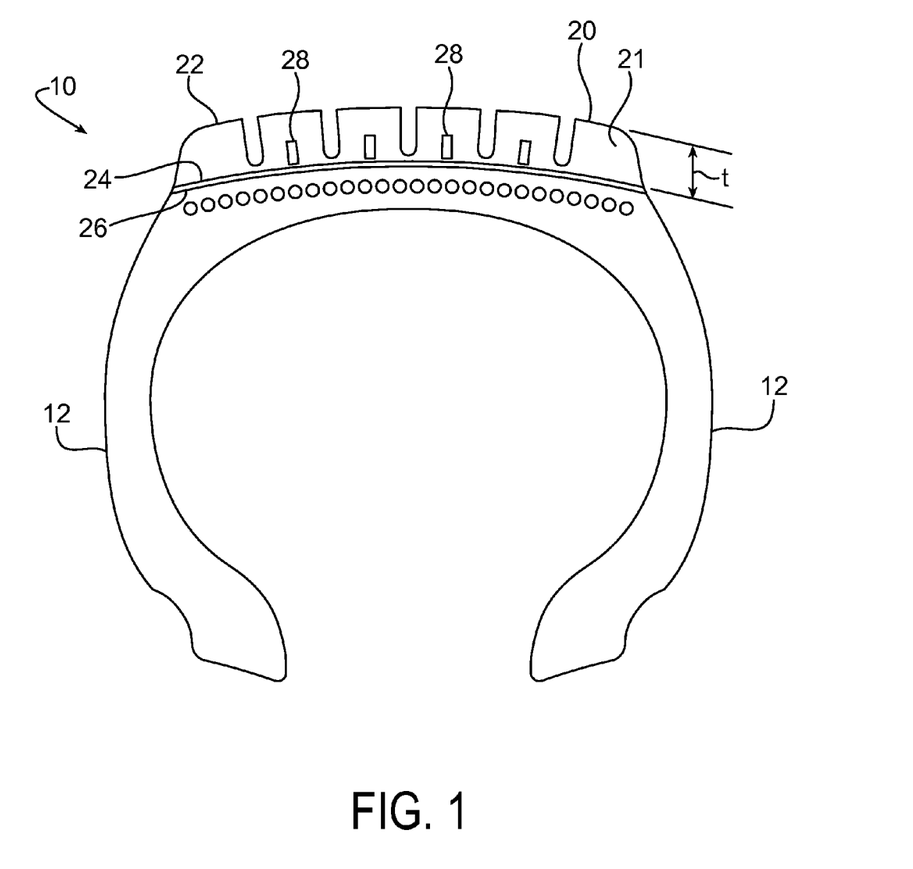
FIG. 1 is a cross-sectional view of an exemplary tire having submerged tread voids, in accordance with an embodiment of the present invention.

With reference to FIG. 1, a cross-sectional view of a tire 10 is generally shown. Tire 10 includes a tread 20 attached to the radial extent of tire 10, the tread 20 having a width extending (widthwise) between opposing sidewalls 12, and a length extending about a circumference of the tire 10. Tread 20 also includes a body 21 extending between an outer surface 22 and an opposing underside surface 24. Outer surface 22 generally engages a tire operating surface, such as a road or ground surface, during tire operation, while underside surface 24 engages a portion of the tire or tire carcass for attachment of tread 20. As mentioned above, an adhesive layer 26 may be provided, where the layer 26 engages the underside 24 of tread 20 to facilitate or promote improved attachment of tread 20 to a portion of tire 10 or tire carcass.

Figure 2:
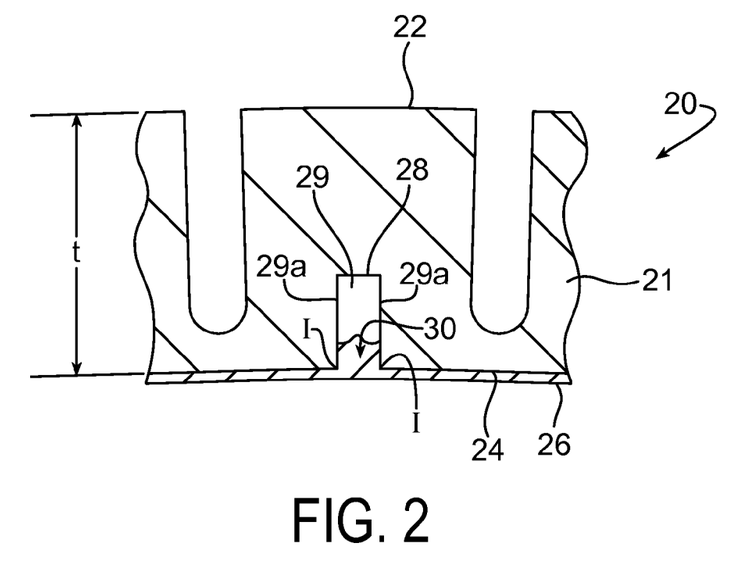
FIG. 2 is an enlarged partial view of a tire, showing a submerged tread void positioned within a tread, where the void does not include any projection or member extending from a side of the void, and positioned between at least a portion of the void and the underside of the tread, which allows undesired material to flow into the void during a tire curing operation, and/or cracks to initiate and/or propagate along the underside of the tread during tire operation.

With continued reference to FIG. 1, tread 20 includes a tread feature 28, which provides a void 29 within a thickness t of tread 20. In the prior art, such as is shown by example in FIG. 2, tread feature 28 or void 29 is substantially exposed to tread underside 24 by way of opening 30, wherein opening 30 is substantially equivalent to a width of void 29. In other words, tread feature 28 or void 29 substantially extends downward to tread underside 24, wherein a width or side 29a of void 29 intersects underside 24 at location I. Accordingly, and as shown by example in FIG. 2, tire materials, such as, for example, adhesive layer 26, may flow or deform into void 29 of tread feature 28 during a tire curing or molding operation, whereby the tire material becomes flowable or fluid due to the heat and pressure provided by any such operation. Because different materials may be positioned adjacent to underside 24, such materials may be more or less flowable or fluid during particular molding or curing operations. Any such material may also be more or less flowable or fluid when using different molding or curing parameters, such as, for example, elevated or reduced heat or pressure. Further, cracks may also initiate and/or propagate at intersection I of side 29a and tread underside 24 during tire operation, as intersection I may become an area of concentrated stress.

Figure 3:
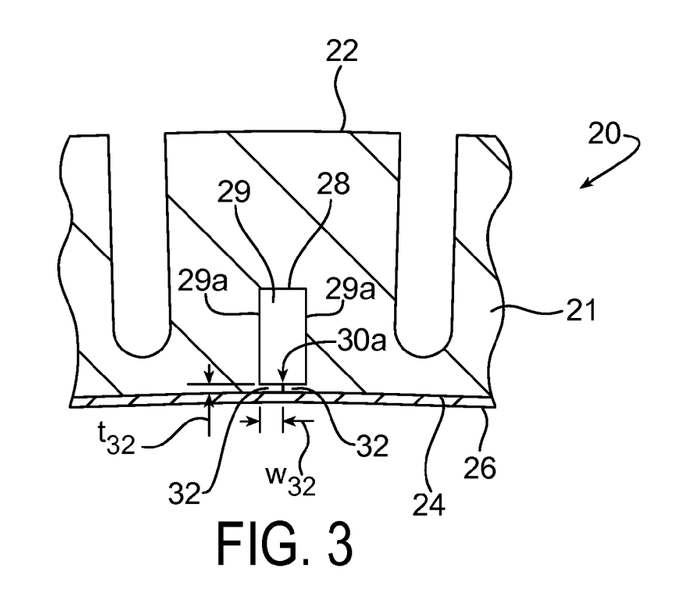
FIG. 3 is an enlarged view of a tire, showing a submerged tread void that includes a projection or member extending from a side of the void, and positioned between at least a portion of the void and the underside surface of the tread, so to sufficiently reduce or prevent the flow of undesired material into the void during a tire curing operation, and/or to reduce the initiation and/or propagation of cracks along the underside of the tread during tire operation, in accordance with an embodiment of the present invention.

With reference to FIG. 3, to sufficiently reduce and/or substantially eliminate the flow of material into void 29, and/or to reduce and/or eliminate the initiation and/or propagation of cracks along underside 24, tread 20 may include one or more members 32 extending between at least a portion of void 29 and underside 24. More specifically, each of the one or more members 32 extend from tread body 21, or a side 29a of feature 28 or void 29, to a free end 34 by a desired width $w_{32}$. In other words, one or more members 32 extend at least partially across opening 30, or a width of feature 28 or void 29. Any such tread 20 having one or members 32 may be attached to a tire 10, to form a portion of a tire 10.

When extending between at least a portion of void 29 and underside 24, one or more members 32 may extend substantially along underside 24, such as shown for example in the FIGS. 3-9, or, in other embodiments, may be off-set or spaced-apart from underside 24 by any distance along a side 29a within tread thickness t. It is understood that any such tread feature 28 or void 29 may also be open to, or in communication with, tread outer surface 22. Accordingly, a tread feature 28 may be submerged below outer tread surface 22 (i.e., a hidden or embedded feature), or may be partially submerged (i.e., portions of feature 28 are in communication with or exposed to outer surface 22), or not submerged (i.e., substantially or fully exposed to outer surface 22). As stated above, feature 28 includes void 29.

With continued reference to FIG. 3, crack initiation and/or propagation may be reduced and/or eliminated when one or more members 32 extend from a side 29a of void 29 or feature 28, between at least a portion of void 29 and underside 24. To reduce and/or eliminate crack initiation and/or propagation, any member 32 having a thickness $t_{32}$ may extend any distance or width $w_{32}$ from a side 29a. Accordingly, a member 32 may extend partially across opening 30 or a width of void 29, such as is shown by example in FIGS. 3-6b, 7b, or at least substantially across opening 30 or a width of void 29, such as is shown by example in FIGS. 7a, 8-9. With general reference to FIGS. 6b-7b, members 32 may overlap. By providing a member 32 that extends from a side 29a, the crack initiation site I may be eliminated or moved to a location of reduced stress. Further, when a free end 34 abuts or substantially approaches an opposing side 29a, such as is shown by example in FIG. 8, or extends beyond an opposing side 29a, such as is shown by example in FIG. 9, crack initiation and/or propagation may be reduced and/or eliminated along such opposing side 29a.

In particular embodiments, for reducing and/or eliminating crack initiation and/or propagation, each member 32 has a minimum width $w_{32}$ of at least approximately 0.5 millimeters (mm), or at least approximately 1 millimeter (mm), while also having a maximum thickness $t_{32, max}$ of at least approximately 0.5 mm. In other embodiments, the one or more members 32 may comprise any other width, thickness, or shape to provide a sufficiently rigid member 32 for reducing, transferring, and/or eliminating crack initiation and/or propagation at location I. Any such member 32 may vary based upon the size and/or shape of the associated feature 28 or void 29, the physical and chemical properties of the material forming tread 20, and the loadings imposed upon tread 20 during tire operation. When members 32 overlap or abut, as suggested above, the dimension of any such member 32 may be reduced, as additional support may be provided by the other overlapping or abutting member 32.

When providing any member 32 according to this invention, crack initiation and propagation may arise along the top (i.e., void-side) surface of such member 32, at or near the location from which member 32 extends from (i.e., intersects) side 29a. With general reference to FIGS. 5, 7-9, a transition 33 may be provided to reduce and/or eliminate this crack initiation and/or propagation, which operates to reducing or substantially eliminate any local stress concentration. Such transition may comprise a filet (i.e., a radiused, curvilinear, or non-linear transition 33) as shown in the FIGURES, or a chamfer (i.e., a linear transition 33), for example. A member 32 having a transition 33 may be considered to be a variable thickness member 32.

Figure 6A:
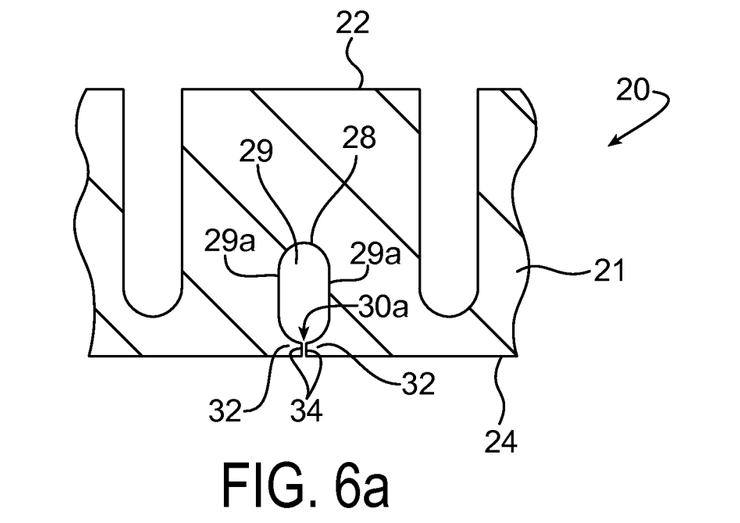
FIG. 6a is an enlarged partial view of a tire tread, which provides an alternative embodiment of the tread shown in FIG. 3, where the cross-sectional shape of the void is oval-shaped and the opening is reduced to a sufficiently narrowed opening, in accordance with an embodiment of the present invention.
Figure 6B:
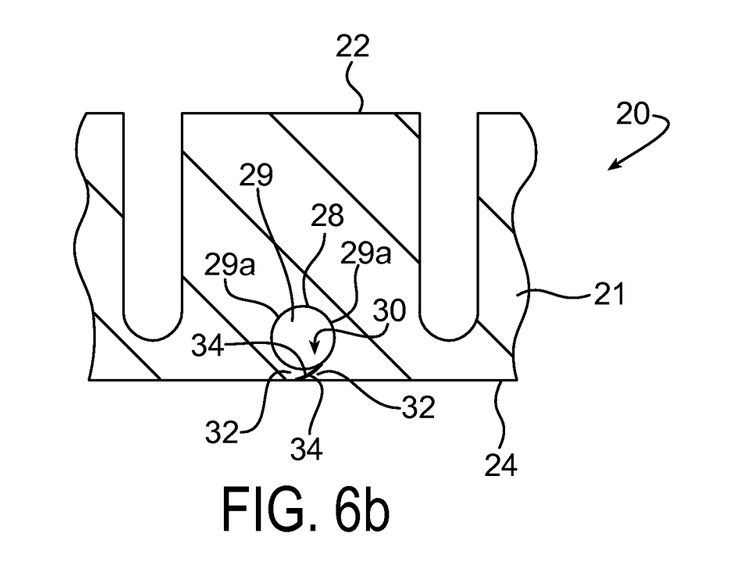
FIG. 6b is an enlarged partial view of a tire tread, which provides an alternative embodiment of the tread shown in FIG. 3, where the cross-sectional shape of the void is circular and the members overlap, in accordance with an embodiment of the present invention.
Figure 7A:
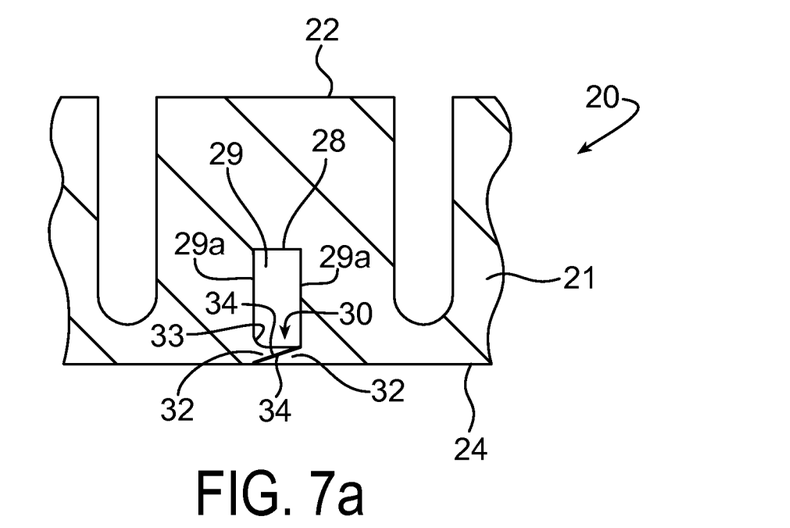
FIG. 7a is an enlarged partial view of a tire tread, which provides an alternative embodiment of the features shown in FIG. 3, where the members extend from opposing sides of the void and overlap each other, in accordance with an embodiment of the present invention.
Figure 7B:
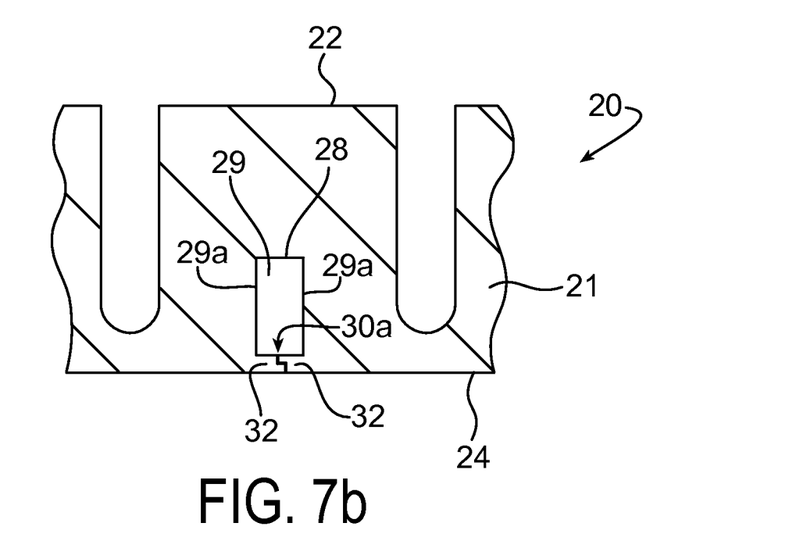
FIG. 7b is an enlarged partial view of a tire tread, which provides an alternative embodiment of the features shown in FIG. 7a, where the members extend from opposing sides of the void and overlap each other by way of mating notches or a mating profile, in accordance with an embodiment of the present invention.
Figure 8:
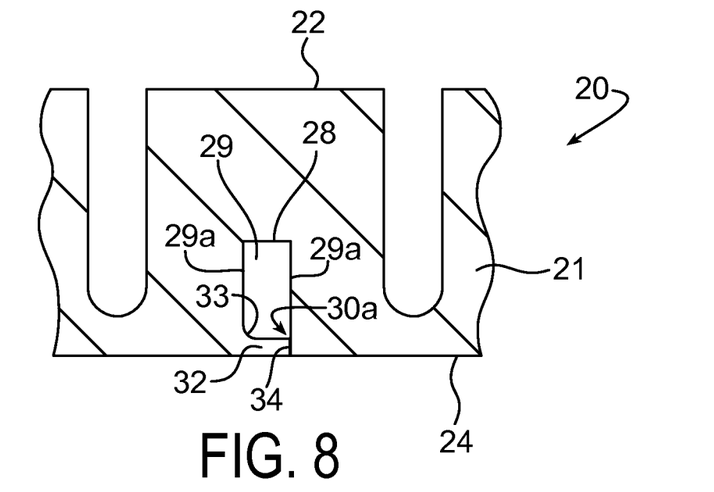
FIG. 8 is an enlarged partial view of a tire tread, which provides an alternative embodiment of the features shown in FIG. 3, where the member extends from one side of the void to provide a sufficiently narrowed or substantially closed opening, in accordance with an embodiment of the present invention.
Figure 9:
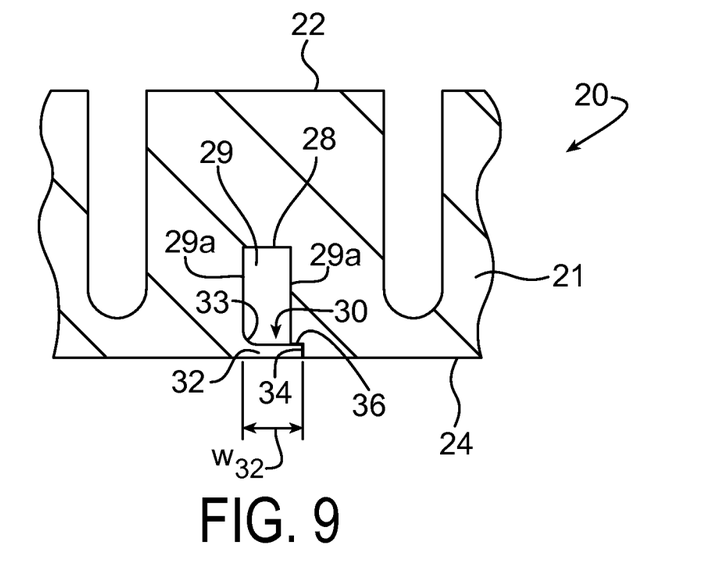
FIG. 9 is an enlarged partial view of a tire tread, which provides an alternative embodiment of the features shown in FIG. 8, where the member extends from one side of the void to engage a notch or recess along the opposing side of the void, in accordance with an embodiment of the present invention.

In particular embodiments, the flow or displacement of undesired material into feature 28 or void 29 from underside 24 is reduced and/or eliminated as desired when one or more members 32 extend from a side 29a of feature 28 and/or void 29, or from tread body 21, to provide a sufficiently narrowed or substantially closed opening 30a (i.e., sufficiently extend across or substantially span opening 30), at least upon application of tread 20 to a tire 10 or tire carcass. For example, the one or more members 32 in FIGS. 3-9 may extend to provide a narrowed or closed opening 30a, which is formed between opposing members 32, as generally represented by FIGS. 3-7b, or between a member 32 and a side 29a or portion of tread body 21, as generally represented by FIGS. 8-9. As such, the one or more members 32 operate as a bather or flow-restrictor between underside 24 and void 29 by sufficiently or substantially separating at least a portion of void 29 from underside 24. Any such member 32 may be referred to as a barrier, a flow restrictor, an impediment, or a flap.

In particular embodiments, such as, for example, treads used in certain over-the-road truck tires, the width of narrowed opening 30a measures approximately 2 millimeters (mm) or less, and in other embodiments, approximately 1 mm or less. In other embodiments, a sufficiently narrowed opening 30a may be greater than 1 or 2 mm, that is, it may be sufficient for opening 30a to be greater than 1 or 2 mm for the purpose of reducing or eliminating flow of material into void 29 in certain conditions. For example, the undesired material may not be as fluid or deformable during particular molding and/or curing operations, as different molding and/or curing parameters, such as temperatures and/or pressures, may be altered. Further, because the undesired material located adjacent the void may vary, a material having different physical and chemical properties may be less fluid or deformable at similar molding or curing conditions. Still further, members 32 having increased rigidity may deform less, which may allow for larger openings 30a. More rigid members 32 may be achieved by providing increased cross-sectional area, or by employing overlapping or abutting members 32, for example. Any of the one or more members 32 in FIGS. 3-9 may operate to form sufficiently narrowed openings 30a, as generally shown for example in FIG. 6a, or may form substantially closed openings 30a (i.e., substantially closed opening 30), as generally shown for example in FIGS. 3-5, 6b-9.

Substantially closed openings 30a (i.e., where opening 30 is substantially closed) arise when one or more members 32 substantially extend across opening 30, such as one or more members 32 substantially abut or overlap another member 32, a side 29a, or any other portion of tread body 21. For example, members 32 in FIGS. 3-5 extend to abut each other, while members 32 in FIGS. 6b-7b overlap each other. In FIG. 8, member 32 extends to abut opposing side 29a or tread body 21. Finally, in FIG. 9, member 32 abuts or engages tread body 21 by way of notch or recess 36. When members 32 are provided to reduce and/or eliminate the influx or flow of undesired material into any void 29, a reduction and/or elimination of crack initiation and/or propagation may also be achieved.

With reference to FIGS. 4-11, various alternative embodiments of members 32 are shown in cross-section. It is contemplated that the one or more members 32, however, may comprise any desired shape or design. Further, any member 32 may extend along any length or width of tread 20. More specifically, a member 32 may extend transversely, obliquely, or circumferentially along any partial or entire width or length of tread 20.

Each member 32 has a thickness $t_{32}$, which may be constant or variable across width $w_{32}$. More specifically, with general reference to FIG. 4, each member 32 may have a maximum thickness $t_{32,\,max}$ and a minimum thickness $t_{32,\,min}$. For example, as specifically shown in FIG. 4, and non-specifically shown in FIGS. 5-7a, for a variable thickness member 32, the maximum thickness $t_{32,\,max}$ may occur along an adjoining side 29a (i.e., along the side from which a member 32 extends) and minimum thickness $t_{32,\,min}$ at free end 34. Of course, maximum thickness $t_{32,\,max}$ and minimum thickness $t_{32,\,min}$ may each occur at any location along width $w_{32}$ of a variable thickness member 32 (i.e., at any location between opposing ends of member 32, such as between an adjoining side 29a and a free end 34). In particular embodiments, a member 32 may have a maximum thickness $t_{32,\,max}$ of at least approximately 0.5 mm, 1 mm, or 2 mm. When a member 32 tapers to a point, such as is shown for example in FIGS. 6b and 7a, minimum thickness $t_{32,\,min}$ may approach zero. A substantially constant thickness member 32 is shown for example in FIG. 3.

Figure 4:
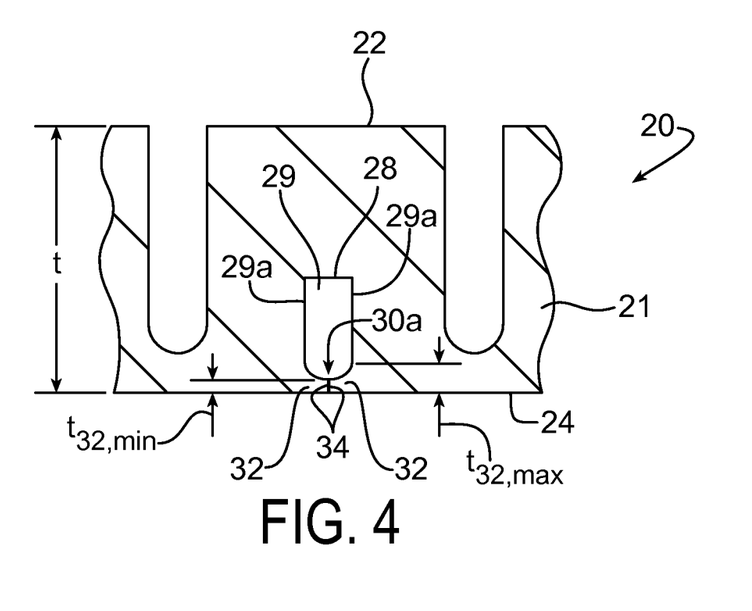
FIG. 4 is an enlarged partial view of a tire tread, which provides an alternative embodiment of the features shown in FIG. 3, the tread including a submerged void and projections or members extending from a side of the void, and extending between at least a portion of the void and the underside of the tread, so to substantially prevent material from flowing into the void during tire curing operations, and/or to reduce the initiation and/or propagation of cracks along the underside of the tread during tire operation, where the members taper non-linearly from the edges of the void in accordance with an alternative embodiment of the present invention.
Figure 5:
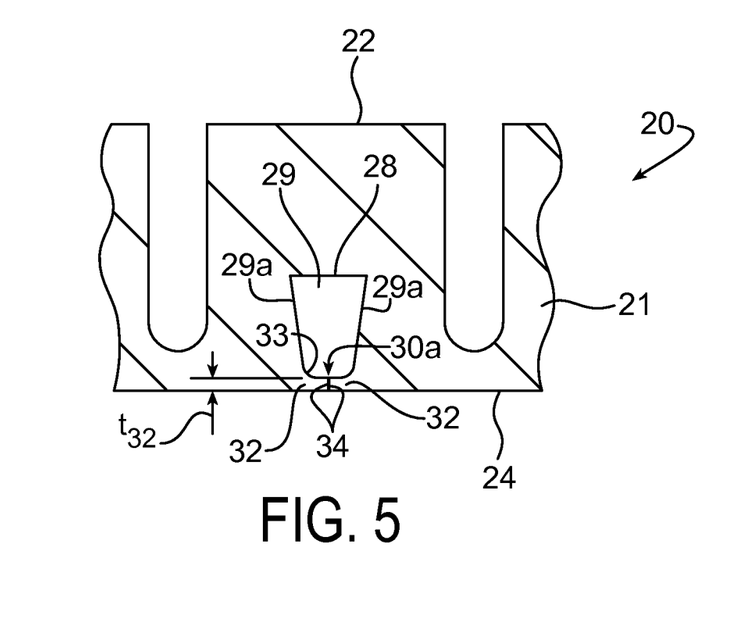
FIG. 5 is an enlarged partial view of a tire tread, which provides an alternative embodiment of the features shown in FIG. 3, where the void forms a trapezoid, and the projections or members include transitions or filets, in accordance with an embodiment of the present invention.

A constant or variable thickness member 32 may extend linearly or non-linearly along width $w_{32}$. With general reference to FIGS. 4-9, non-linearly extending members 32 are shown. A constant thickness member 32 is shown to extend linearly in FIG. 3. With reference to FIGS. 5, 7a-7b, variations of the embodiments shown may exclude transition members 33, and subsequently provide variable thickness members 32 that extend or taper linearly. A non-linearly extending member 32 may include portions (i.e., a top (or void-side) and/or bottom (or underside-side) surface of member 32) that extend in any non-linear direction or path, such as, without limitation, any arcuate, curvilinear (wave), or stepped direction or path. An arcuate path is shown in FIGS. 4, 6a-6b.

As mentioned above, feature 28 may comprise any desirous feature of tread 20. For example, feature 28 may be a groove or any other pocket or segment forming a void 29, which may be provided to increase the void ratio of tread 20. This may be beneficial, for example, for improved wet, snow, or soft-soil (i.e., dirt, mud, or sand) performance. Void 29 of feature 28 may also comprise a sipe, which is essentially a thin groove that is to close (i.e., collapse inwardly on itself) as it enters and continues through a tire footprint, and later open as it exists the tire footprint. Accordingly, the shape of feature 28 and void 29 may comprise any cross-sectional shape. With reference to FIGS. 3-4, for example, the cross-sectional shape of feature 28 and/or void 29 may be generally rectangular. With general reference to FIGS. 5-6a, feature 28 and/or void 29 may be generally trapezoidal or oval-shaped, respectively. With reference to FIG. 6b, void 29 may be circular, and in particular embodiments, may comprise a circle having a diameter of at least approximately 6 mm, and one or more members 32 having a maximum thickness $t_{32,\,max}$ of approximately 3 mm or more. In particular embodiments, void 29 is approximately 6-8 mm wide and 8 mm tall in cross-section; however, in other embodiments, void 29 may comprise any other desired size.

With general reference to FIGS. 6b-7b, two or more members 32 may overlap each other while extending at least partially across void opening 30. To achieve an overlapping arrangement of members 32, at least one member 32 may have a variable or tapered thickness. The embodiments shown in FIGS. 6b-7a provide overlapping members 32, each of which includes a tapered or variable thickness $t_{32}$. In other embodiments, members 32 having a substantially constant thickness $t_{32}$ may overlap, such as by altering or staggering the vertical positions of each member 32, such as along a side 29a or tread thickness t. For example, the embodiment shown in FIG. 8 may be altered to provide a staggered arrangement of overlapping members 32, whereby a second member 32 extends from a side 29a opposite existing member 32 and to a position above the existing member 32, where at least one of the members 32 has a substantially constant thickness $t_{32}$. It is also contemplated that each of the members 32 in a staggered arrangement of members 32 may have a variable or tapered thickness $t_{32}$. In still other variations, overlapping members 32 may be achieved by providing a notched, stepped, or contoured (linear or non-linear) interface between opposing members 32, such as is generally shown in FIG. 7b, according to one embodiment. Variations may also include texturizing, or providing features, such as grooves or undulations, along one or more, interfacing surfaces of overlapping members 32 to promote interlocking, bonding, or a mechanical interface between the overlapping members 32, or to otherwise to allow members 32 to better resist forces being applied to the one or more members 32. A sufficiently reduced or substantially closed opening 30a may be formed between overlapping members 32.

As an alternative to the embodiments shown in FIGS. 3-7b, where a pair of members 32 extend from opposing sides of a void 29 to cooperatively reduce or close opening 30, a single member 32 may extend across at least a portion feature 28 and/or void 29 to sufficiently reduce or substantially close opening 30 (i.e., to form sufficiently reduced or substantially closed opening 30a), such as is generally represented by FIGS. 8-9. Accordingly, at least along a particular length of tread 20, a single member 32 may extend across at least a portion of, or span, opening 30, or a width of void 29, along the underside 24 of tread 20. In the variation shown in FIG. 8, the free end 34 of member 32 provides a reduced opening 30a, which have a width approximately 2 mm or less, or 1 mm or less, in particular embodiments. In other embodiments, free end 34 contacts or abuts opposing side 29a of feature 28, void 29, and/or opening 30.

In the variation shown in FIG. 9, a member 32 extends by a width $w_{32}$ that is wider than opening 30. In FIG. 9, for example, free end 34 of a member 32 may engage a notch 36 located along the opposing side of the feature 28 and/or void 29. Notch 36 may comprise any shape, such as, for example, a stepped, rounded, or angled (tapered) interface, or any shape to facilitate interlocking with a member 32. The notch 36 shown in FIG. 9 is a step-shaped notch. A notch 36 may allow a member 32 to better resist the influx of material attempting to enter the void 29 and displace member 32, as the notch 36 provides a surface against which member 32 may engage to resist forces acting upon member 32. Surface features or textures may also be provided along the notch 36 and/or an interfacing portion of a member 32 to facilitate interlocking between notch 36 and member 32.

Figure 10A:
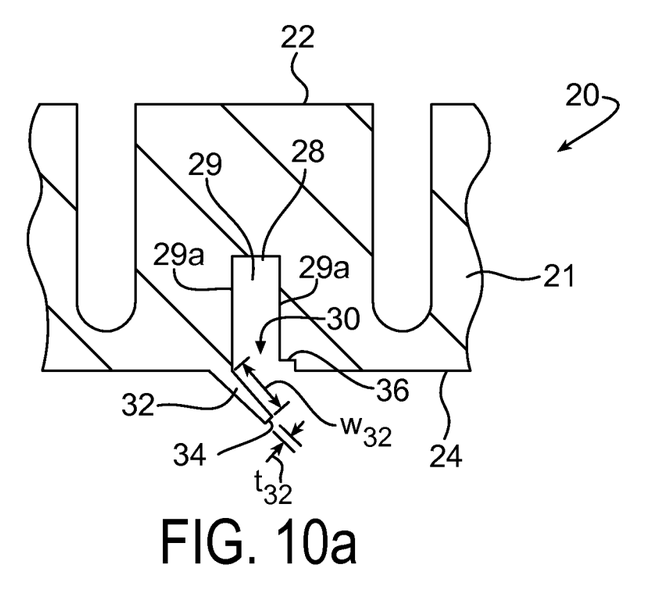
FIG. 10a is an enlarged partial view of a tire tread, which provides an alternative embodiment of the features shown in FIG. 9, where the members are molded in an open position, which substantially closes upon application to a tire, in accordance with an embodiment of the present invention.
Figure 10B:
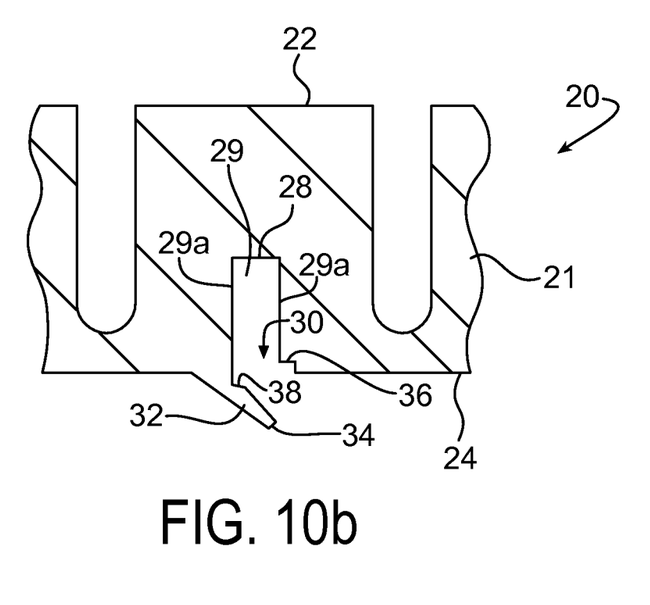
FIG. 10b is an enlarged partial view of a tire tread, which provides an alternative embodiment of the features shown in FIG. 10a, where the member includes a notch to promote closure of the member upon the void, in accordance with an embodiment of the present invention.
Figure 11:
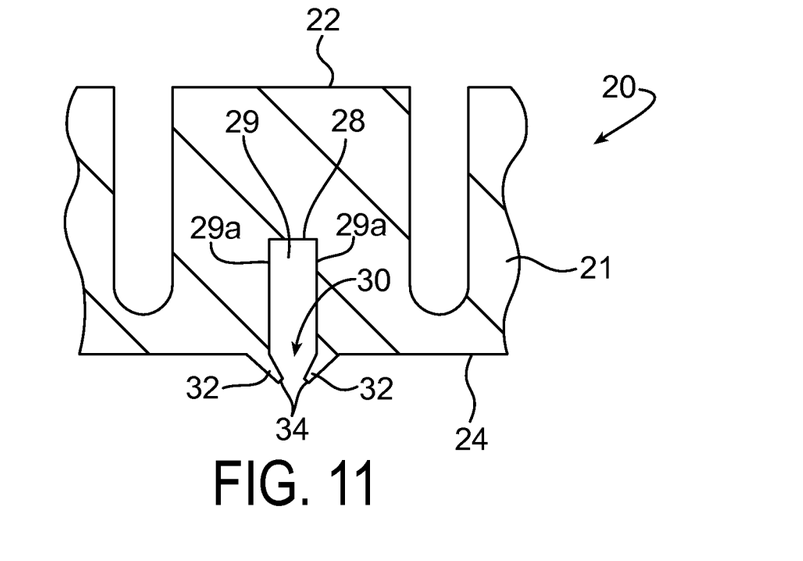
FIG. 11 is an enlarged partial view of a tire tread, which provides an alternative embodiment of the features shown in FIG. 4, where the members are molded in an open position, in accordance with an embodiment of the present invention.

With general reference to FIGS. 10a-11, alternative embodiments of members 32 are provided. In such embodiments, one or more members 32 are molded in an open position relative to opening 30, such that the one or more members 32 are molded to extend outwardly from underside 24 of tread 20, and upon application of the tread 20 to a tire or tire carcass, the one or more members 32 are deflected and forced to extend across at least a portion of opening 30 to operate as the one or more members 32 discussed above in other embodiments. For example, the embodiment shown in FIG. 10a is generally an open version of the embodiment shown in FIG. 9, while the embodiment shown in FIG. 11 is an open version of the embodiment shown in FIG. 4 or FIG. 7a. As generally shown by example in FIG. 10b, a notch 38 may be placed along any side of member 32 to facilitate improved deflection and closure of member 32 upon void 29 and opening 30. A notch 38 (as well as notch 36) having rounded features may better resist crack initiation during tire operation.

Figure 12:
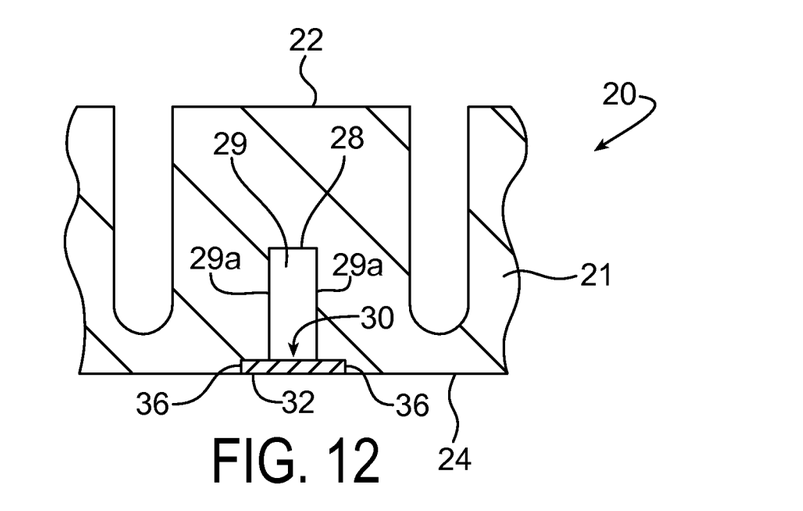
FIG. 12 is an enlarged partial view of a tire tread, which provides an alternative embodiment of the features shown in FIG. 3, where an independently formed member is applied to the tire tread to extend from each side of the void, in accordance with an embodiment of the present invention.

In other embodiments, one or more members 32 may be formed independent of tread 20, and subsequently applied to tread 20, in lieu of being formed (i.e., molded) with tread 20. For example, any member 32 discussed above may be formed independently from tread 20. With general reference to FIG. 12, in other variations, a member 32 may extend across void 29 from a side 29a of void 29 between opposing notches 36, which may allow the one or more members 32 to be positioned within the thickness of tread 20, and without protruding beyond underside surface 24. In other variations, an independently formed member 32 may engage only one notch 36, or may not engage any notch 36. Any independent member 32 may be applied or attached to pre-formed or pre-molded tread 20 or tire 10 prior to finally molding and/or curing tire 10. Any means known to one of ordinary skill in the art may be used to attach an independent member 32 to tread 20 and/or tire 10, such as, for example, an adhesive. In contrast, the one or more members 32 formed in FIGS. 3-11 are formed monolithically with tread body 21, such as by molding for example.

In any embodiment discussed above, tread features 28, voids 29, underside 24, members 32, and any other molded surfaces, may be treated in an effort to reduce and/or eliminate the contamination thereof prior to and/or during post-molding processes. By reducing or eliminating contamination, improved adhesion and bonding of tread 20 and members 32 to the tire or tire carcass is provided. Improved adhesion and bonding may also occur between contacting members 32. A variety of materials and/or processes known to one of ordinary skill in the art may be used to prepare, protect and preserve tread surfaces to facilitate sufficient bonding with a tire. Surfaces may be created and protected by molding said surfaces against films or tissues. Surfaces may be cleaned and/or texturized by brushing, grinding, or by use of chemicals, blasting process, such as cryogenic $CO_2$ blasting, laser ablation, or with any other processes or combinations of processes generally known to one of ordinary skill in the art.

Figure 13:
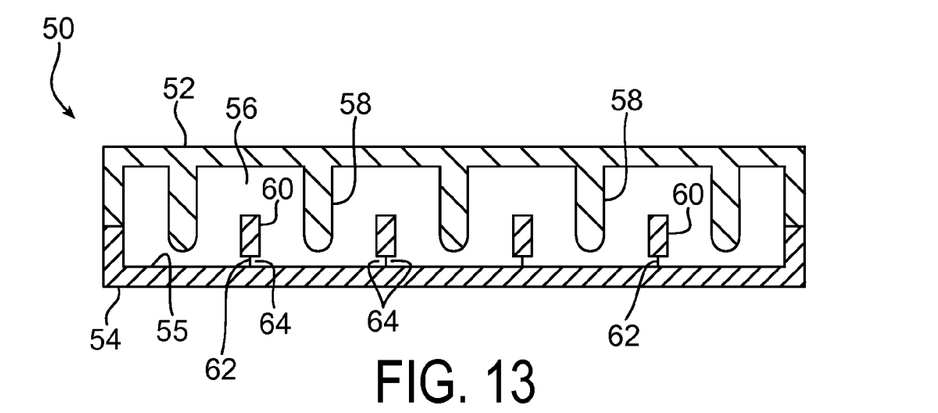
FIG. 13 is a cross-sectional end view of a mold for use in forming the inventive tread features generally shown in FIG. 3, in accordance with an embodiment of the present invention.

With general reference to FIG. 13, a mold 50 is provided for forming members 32 within a tread 20. Mold 50 may be used to form any member 32 discussed above, or any variation thereof. Mold 50 generally comprises a plurality of mold portions that form a mold cavity 56. In the embodiment shown in FIG. 13, mold 50 generally includes opposing mold portions 52, 54, which together form mold cavity 56. First mold portion 52 and second mold portion 54 may each include elements for forming any desired tread feature within a tread 20. For example, mold elements 58 may extend into cavity 56 from first mold portion 52 to form a tread feature, such as grooves or sipes, along outer tread surface 22. Further, second mold portion 54 includes one or more void-forming elements 60 extending from bottom surface 55. Each void-forming element 60 forms a feature 28 and/or a corresponding void 29 along underside 24 of a tread 20. Second mold portion 54 also includes one or more recess-forming elements 62 for forming one or more recesses 64.

Recesses 64 are formed between a void-forming element 60 and mold bottom surface 55, and in conjunction with recess-forming elements 62. Each recess 64 forms any member 32 disclosed or contemplated above, in a corresponding tread 20. The one or more recesses 64 extend at least partially across a width of the void-forming element, as one or more members 32 extend across a width of void 29 discussed above. In particular embodiments, the one or more recesses 64 may extend at least approximately 0.5 mm, 1 mm, or 2 mm. Recesses 64 having smaller widths may exist in other embodiments. Further, the recess-forming element 62 may form a reduced opening 30a of void 29 in the tread 20, and have a width substantially similar to any width of reduced opening 30a contemplated above. In particular embodiments, recess-forming element 62 has a width of approximately 2 mm or less, or 1 mm or less. In other embodiments, a recess-forming element 62 may have larger widths.

Recess-forming elements 62 maintain void-forming elements 60 in a spaced apart relation from bottom surface 55, which forms tread underside surface 24. Void-forming element 60 and corresponding recess-forming element 62 may be formed as a single mold element, or may be formed independently and subsequently joined for use in mold 50. It is contemplated that recess-forming elements 62 may not exist, and, instead, a portion of void-forming element 60 may operate as a recess-forming element 62. Mold elements 60 and/or 62 may be formed with a corresponding mold portion 54, or may be formed separately and attached to mold portion 54 by any known means, such as, for example, by use of fasteners or welding.

Figure 14:
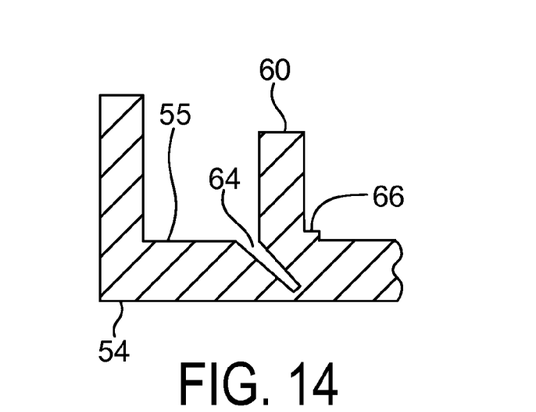
FIG. 14 is an enlarged partial cross-sectional view of a mold, showing an alternative embodiment mold of FIG. 13, where such mold forms the tread shown in FIG. 10a, in accordance with an embodiment of the present invention.

In other embodiments, such as shown in FIG. 14 by example, one or more recesses 64 for forming members 32 may extend into cavity bottom surface 55. In such embodiments, mold 50 is generally used to form members 32 that are molded in an open position, as discussed above and generally shown in FIGS. 10a-11, which extend outwardly (i.e., downwardly) from the tread underside surface 24. Mold 50 may also include notch-forming elements 66 for forming notches 36 in tread 20. Mold 50 may also include any other elements or recesses for forming any other features or portions of tread 20 discussed above, or any variations thereof.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A molded tire tread comprising:
a tread body having a length, a width, and thickness, the thickness being bounded by an outer surface and an underside surface, the outer surface being configured for engaging a tire operating surface and the underside surface being configured for engaging a tire carcass;
a void positioned within the thickness of the tread body and below the outer surface configured for use along the outer surface at a worn stage of the tire tread;
one or more members extending from a side of the void, and between at least a portion of the void and the tread underside surface to substantially separate the void and the underside surface, each of the one or more members having a free end, where each of the one or more members extend at least partially across a width of the void and where the one or more members overlap.

2. The tire tread of claim 1, wherein the tread forms a portion of a tire.

3. The tire tread of claim 1, wherein each of the one or more members are monolithically formed with the tread body.

4. The tire tread of claim 1, wherein the void comprises a groove or a sipe.

5. The tire tread of claim 1, wherein each of the one or more members have a width of at least approximately 0.5 mm.

6. The tire tread of claim 1, wherein each of the one or more members have a thickness of at least approximately 0.5 mm.

7. The tire tread of claim 1, wherein the one or more members extend to form a reduced opening.

8. The tire tread of claim 7, wherein the reduced opening has a width of approximately 2 mm or less.

9. The tire tread of claim 7, wherein the reduced opening is substantially closed.

10. The tire tread of claim 9, wherein the one or more members comprise a pair of opposing members that substantially abut to form the substantially closed opening.

11. The tire tread of claim 1, wherein the thickness of at least one of members varies along a width of the member.

12. The tire tread of claim 1, wherein the one or more members extend along the tread underside surface.

13. The tire tread of claim 1, wherein the void is submerged below the outer tread surface.

14. A molded tire tread comprising:
a tread body having a length, a width, and thickness, the thickness being bounded by an outer surface and an underside surface, the outer surface being configured for engaging a tire operating surface and the underside surface being configured for engaging a tire carcass;
a void positioned within the thickness of the tread body and below the outer surface configured for use along the outer surface at a worn stage of the tire tread;
one or more members extending from a side of the void, and between at least a portion of the void and the tread underside surface to substantially separate the void and the underside surface, each of the one or more members having a free end, where at least one of the one or more members extend substantially across an opening of the void.

15. The tire tread of claim 14, wherein at least one of the one or more members engage a notch positioned in the tread body.

16. A molded tire tread comprising:
a tread body having a length, a width, and thickness, the thickness being bounded by an outer surface and an underside surface, the outer surface being configured for engaging a tire operating surface and the underside surface being configured for engaging a tire carcass;
a void positioned within the thickness of the tread body and below the outer surface configured for use along the outer surface at a worn stage of the tire tread;
one or more members extending from a side of the void, and between at least a portion of the void and the tread underside surface to substantially separate the void and the underside surface, each of the one or more members having a free end, where each of the one or more members extend at least partially across a width of the void and where the one or more members extend outwardly from the underside surface.

17. The tire tread of claim 16, wherein the one or more members collectively extend substantially across the width of the void to substantially close communication between the void and the underside of the tread when the one or more members are positioned in a deflected arrangement.

18. The tire tread of claim 17, wherein at least one of the one or more members extend substantially across the void when positioned in the deflected arrangement.

19. The tire tread of claim 16, wherein the one or more members comprise a pair of members, each of the members extending from opposing sides of the void.

20. The tire tread of claim 19, wherein the one or more members overlap.

21. A molded tire tread comprising:
a tread body having a length, a width, and thickness, the thickness being bounded by an outer surface and an underside surface, the outer surface being configured for engaging a tire operating surface and the underside surface being configured for engaging a tire carcass;
a void positioned within the thickness of the tread body and below the outer surface configured for use along the outer surface at a worn stage of the tire tread;
one or more members extending from a side of the void, and between at least a portion of the void and the tread underside surface to substantially separate the void and the underside surface, each of the one or more members having a free end, where each of the one or more members extend at least partially across a width of the void and where the one or more members comprise an independently formed member extending across a width of the void, the member having opposing ends each engaging a notch positioned within the tread body along the side of the void.

* * * * *